United States Patent
Tam et al.

(10) Patent No.: US 7,674,409 B1
(45) Date of Patent: Mar. 9, 2010

(54) PROCESS FOR MAKING UNIFORM HIGH STRENGTH YARNS AND FIBROUS SHEETS

(75) Inventors: Thomas Y-T. Tam, Richmond, VA (US);
Chok B. Tan, Richmond, VA (US);
Brian D. Arvidson, Chester, VA (US)

(73) Assignee: Honeywell International Inc., Morristown, NJ (US)

( * ) Notice: Subject to any disclaimer, the term of this patent is extended or adjusted under 35 U.S.C. 154(b) by 659 days.

(21) Appl. No.: 11/526,350

(22) Filed: Sep. 25, 2006

(51) Int. Cl.
*D02G 3/10* (2006.01)

(52) U.S. Cl. ............... 264/103; 264/184; 264/203; 264/205; 264/210.8; 264/211.12; 264/211.14; 264/211.15; 264/211.17; 264/290.5

(58) Field of Classification Search ........... 264/103, 264/184, 203, 205, 210.8, 211.12, 211.14, 264/211.15, 211.17, 290.5
See application file for complete search history.

(56) References Cited

U.S. PATENT DOCUMENTS

| | | | | |
|---|---|---|---|---|
| 4,551,296 A | * | 11/1985 | Kavesh et al. | 264/203 |
| 4,663,101 A | * | 5/1987 | Kavesh et al. | 264/178 F |
| 5,173,138 A | | 12/1992 | Blauch | |
| 5,773,370 A | * | 6/1998 | Dunbar et al. | 442/60 |
| 6,126,879 A | * | 10/2000 | Sandor et al. | 264/177.2 |
| 6,129,193 A | | 10/2000 | Link | 192/84.1 |
| 6,448,359 B1 | | 9/2002 | Kavesh | 526/352 |
| 6,457,666 B1 | * | 10/2002 | Niederer | 242/419.9 |
| 6,969,533 B1 | | 11/2005 | Martin et al. | 424/728 |
| 7,316,366 B2 | * | 1/2008 | Ingram, III | 242/131.1 |
| 2004/0040176 A1 | | 3/2004 | Mencke | 34/445 |
| 2005/0093200 A1 | * | 5/2005 | Tam et al. | 264/211.14 |

FOREIGN PATENT DOCUMENTS

| | | |
|---|---|---|
| EP | 0423808 | 4/1991 |
| WO | WO2005051823 | 6/2009 |

* cited by examiner

*Primary Examiner*—Yogendra N Gupta
*Assistant Examiner*—Daniel Lee
(74) *Attorney, Agent, or Firm*—Erika S. Wilson

(57) ABSTRACT

Methods for preparation of high strength yarns having superior yarn-to-yarn uniformity of denier, tenacity and tensile modulus and uniform unidirectional fibrous sheets. Ballistic composites prepared from these yarns and fibrous sheets have improved uniformity of ballistic resistance.

The drawn yarns, fibrous sheets and articles made therefrom are more uniform than the prior art and are useful in applications requiring impact absorption and ballistic resistance, such as body armor, helmets, breast plates, helicopter seats, spall shields; composite sports equipment such as kayaks, canoes, bicycles and boats; and in fishing line, sails, ropes, sutures and fabrics.

14 Claims, 1 Drawing Sheet

PROCESS FOR MAKING UNIFORM HIGH STRENGTH YARNS AND FIBROUS SHEETS

BACKGROUND OF THE INVENTION

1. Field of the Invention

This invention relates to methods for preparing high strength yarns having superior yarn-to-yarn uniformity of denier, tenacity and tensile modulus and to methods for preparing uniform unidirectional fibrous sheets. Ballistic composites prepared from these yarns and fibrous sheets have improved uniformity of ballistic resistance.

The yarns and fibrous sheets are useful in applications requiring impact absorption, penetration resistance and ballistic resistance, such as body armor, helmets, breast plates, helicopter seats, spall shields; composite sports equipment such as kayaks, canoes, bicycles and boats; and in fishing line, sails, ropes, sutures and fabrics.

2. Description of the Related Art

High strength yarns for the purposes of the invention are yarns having tensile strengths determined by ASTM D2256-02 of at least 17 g/d. Examples of such yarns are aramids such as KEVLAR® brand, polybenzazoles (PBO) such as ZYLON® brand, poly {2,6-diimidazo[4,5-b4'5'-e]pyridinylene-1,4(2,5-dihydroxy)phenylene} such as M5® brand, ultra-high molecular weight poly(alpha-olefins) (UHMWPO), and their blends and mixtures. Ultra-high molecular weight polyolefins include polyethylene, polypropylene, poly(butene-1), poly(4-methyl-pentene-1), their copolymers, adducts, blends and mixtures.

High strength yarns are employed in impact resistant and ballistic resistant articles in the form of woven fabrics and also as cross-plied unidirectional sheets. Woven fabrics are preferably produced from yarns that have a small degree of twist, preferably less than about 2.5 turns/inch (0.98 turns/cm), or else are entangled as described in U.S. Pat. No. 5,773,370. Cross-plied unidirectional sheets are preferably produced from yarns that have been spread into thin layers as described in U.S. Pat. No. 4,916,000. The disclosure of U.S. Pat. No. 4,916,000 is hereby incorporated by reference to the extent not incompatible herewith.

Multi-filament high strength polyethylene yarns are commercially produced from ultra-high molecular weight polyethylene (UHMWPE) by Honeywell International Inc. Gel-spun UHMWPO fibers are prepared by spinning a solution of a UHMWPO into solution filaments, cooling the solution filaments to a gel state, then removing some or all of the spinning solvent. One or more of the solution filaments, the gel filaments and the solid filaments are drawn to a highly oriented state. The gel-spinning process discourages the formation of folded chain lamellae and favors formation of extended chain structures that more efficiently transmit tensile loads.

U.S. Pat. Nos. 4,551,296, 4,663,101, 6,448,659 and 6,969,533 and U.S. application Ser. No. 11/393,218 describe drawing all three of the solution filaments, the gel filaments and the solid filaments. A process for drawing high molecular weight polyethylene yarns is described in U.S. Pat. No. 5,741,451. Yet more recent drawing processes are described in co-pending U.S. application Ser. No. 11/206,838 and in United States Publication 20050093200. An oven useful for drawing polyethylene fibers is described in United States Patent Publication 20040040176. The disclosures of U.S. Pat. Nos. 4,551,296, 4,663,101, 5,741,451, 6,448,659, and 6,969,533, U.S. application Ser. Nos. 11/206,838 and 11/393,218 and United States Publications 20040040176 and 20050093200 are hereby incorporated by reference to the extent not incompatible herewith.

Each of these references represented an advance in the state of the art, however none suggests the process of this invention, and none satisfies all of the needs met by this invention.

SUMMARY OF THE INVENTION

In one embodiment the invention is a process for simultaneously drawing a plurality of substantially identical UHMWPO yarns in a manner that preserves their yarn-to-yarn uniformity and carries this uniformity forward into the drawn yarn. Specifically, this embodiment comprises a process for simultaneously drawing a plurality of UHMWPO yarns comprising the steps of:

a) forming a plurality of substantially identical UHMWPO multi-filament feed yarns comprising a UHMWPO having an intrinsic viscosity measured in decalin at 135° C. of from 5 dl/g to 45 dl/g, said feed yarns having a tenacity of from 5 g/d to 65 g/d (0.43 GPa to 5.56 GPa) as measured by ASTM D2256-02, a denier of from 100 to 20,000, and the filaments of said yarns being of from 0.5 to 100 denier/filament (0.055 to 11.1 tex/filament);

b) winding up said feed yarns without imparting twist to the yarns c) unrolling the plurality of feed yarns without imparting twist to the yarns; wherein the unrolling torque is substantially the same for each yarn;

d) passing the plurality of unrolled feed yarns simultaneously and continuously into, through, and out of an oven wherein one or more zones are present along the yarn path, said zones having temperatures in the range of about 100° C. to about 165° C., and wherein the exiting speed of the yarns from said oven is greater than the entrance speed of the yarns into the oven, said yarns being drawn in the oven;

e) cooling the drawn yarns under tension; and f) winding up a plurality of the drawn yarns without imparting twist thereto.

In another embodiment, the invention is a process for forming a unidirectional fibrous sheet comprising the steps of:

a) selecting a plurality of wound-up multi-filament untwisted high strength yarns selected from the group consisting of UHMPO drawn as described above, poly (p-phenylene tererephthalamide), poly(p-phenylene-2,6-benzobisoxazole), poly {2,6-diimidazo[4,5-b4'5'-e] pyridinylene-1,4(2,5-dihydroxy)phenylene} and their blends and mixtures;

b) unrolling the plurality of high strength yarns without imparting twist to the yarns, wherein the unrolling torque is substantially the same for each yarn;

c) spreading the yarns side-by-side into their constituent filaments to form a unidirectional sheet-like array of substantially parallel filaments:

d) applying a bonding material to the filaments; and e) consolidating the array of filaments and bonding material into a unitary unidirectional fibrous sheet.

The invention includes the fibrous sheet articles prepared by the above method.

BRIEF DESCRIPTION OF THE DRAWINGS

FIG. 1 depicts the use of restraining rolls 40 and drawing rolls 60 external to a drawing oven 50, whereas FIG. 2 depicts the use of drawing rolls both internal 80 and external 60 to a drawing oven 90.

DETAILED DESCRIPTION OF THE INVENTION

Figure 1:
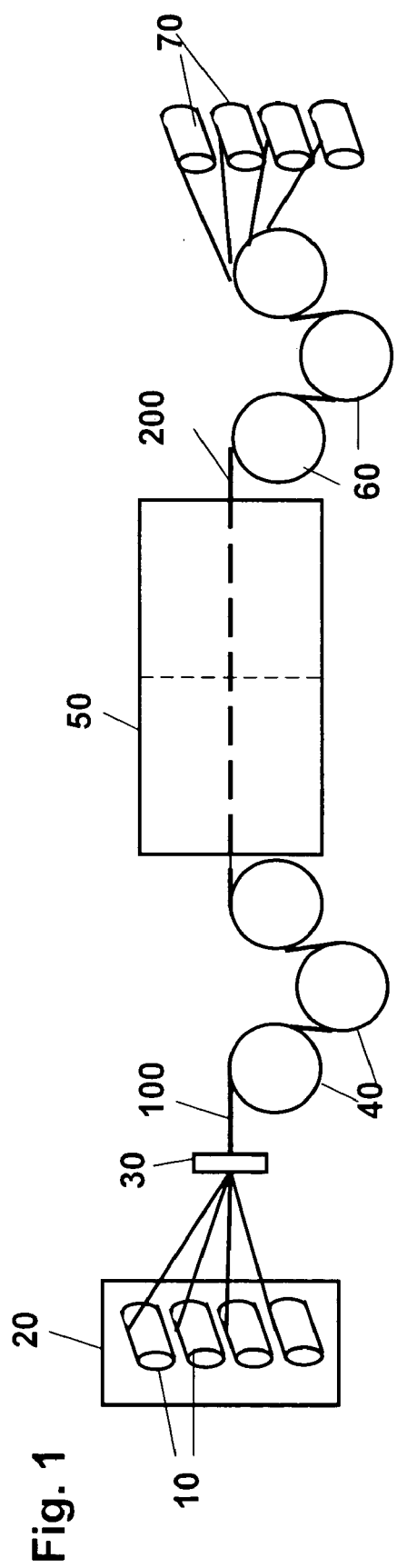
FIGS. 1 and 2 schematically illustrate alternative modes of carrying out the drawing method of the invention.

For purposes of the invention, a fiber is an elongate body the length dimension of which is much greater than the transverse dimensions of width and thickness. Accordingly, the term fiber includes filament, ribbon, strip and the like having regular or irregular cross-section. A yarn is a continuous strand comprised of many fibers or filaments. A yarn package is a yarn wound onto a core.

Many different types of yarn packages are known and used in the fiber industry. The "Dictionary of Fiber and Textile Technology", KoSa Communications and Public Affairs, Charlotte. N.C., 1999, describes package types known as a "cheese", a "cone", a "hosiery cone", a "warp-wind package", a "pineapple package" and a "tube". A "tube" or "tube package" is a cylindrical build-up of yarn wound on a cylindrical core.

In many kinds of fiber operations, it is customary to unwind yarn from a stationary package by pulling the yarn off the end of the package in a direction essentially parallel to the package axis. This mode of unwinding produces a twist in the yarn. Alternatively, a yarn may be unwound from a package by rotating the package about its axis and withdrawing the yarn end in a direction essentially perpendicular to the axis of the package. As used herein, this mode of unwinding is termed "unrolling". For purposes of the invention, if the yarn is unrolled from a package, the unrolling torque is the product of the tension in the unrolling yarn times the outside diameter of the package core. A creel is a framework, typically metal, designed to hold yarn packages so that a plurality of yarn ends may be unwound simultaneously without tangling. The process of the invention may be practiced with a creel designed to unwind yarn packages by unrolling.

A beam is a horizontal cylinder, typically metal, on which a large number of yarns are wound up in preparation for further processing. The process of the invention may also be practiced by unwinding yarns from a beam by unrolling. For purposes of the invention, if the yarn is unrolled from a beam, the unrolling torque is the product of the tension in the unrolling yarn times the outside diameter of the beam.

In one embodiment, the invention is a process for simultaneously drawing multiple UHMWPO yarns comprising the steps of:
  a) forming a plurality of substantially identical UHMWPO multi-filament feed yarns comprising a UHMWPO having an intrinsic viscosity measured in decalin at 135° C. from 5 dl/g to 45 dl/g, said feed yarns having a tenacity of from 5 g/d to 65 g/d (0.43 to 5.56 GPa) as measured by ASTM D2256-02, a denier of from 100 to 20,000, and the filaments of said yarns being of from 0.5 to 100 denier/filament (0.055 to 11.1 tex/filament);
  b) winding up said plurality of feed yarns without imparting twist to the yarns;
  c) unrolling the plurality of feed yarns without imparting twist to the yarns, wherein the unrolling torque is substantially the same for each yarn:
  d) passing the plurality of unrolled feed yarns simultaneously and continuously into, through, and out of an oven, wherein one or more zones are present along the yarn path, said zones having zone temperatures in range of from about 100° C. to about 165° C., and wherein the exiting speed of the yarns from the oven is greater than the entrance speed of the yarns into the oven, said yarns being drawn in the oven;
  e) cooling the so-drawn yarns under tension; and
  f) winding up a plurality of the drawn yarns without imparting twist thereto.

The UHMWPO used in the process of the invention is preferably selected from the group consisting of polyethylene, polypropylene, poly(butene-1), poly(4-methyl-pentene-1), their copolymers and adducts. More preferably, the UHMWPO is a polyethylene with less than one pendent side group per 100 carbon atoms, still more preferably less than one side group per 300 carbon atoms, yet more preferably less than one side group per 500 carbon atoms, and most preferably less than side group per 1000 carbon atoms. Side groups may include but are not limited to C1-C10 alkyl groups, vinyl terminated alkyl groups, norbornene, halogen atoms, carbonyl, hydroxyl, epoxide and carboxyl. The UHMWPO may contain small amounts, generally less than 5 wt. %, preferably less than 3 wt. % of additives such as anti-oxidants, thermal stabilizers, colorants, flow promoters, solvents, etc.

Preferably, the UHMWPO feed yarns are formed by one of the processes described in U.S. Pat. Nos. 4,551,296, 4,663,101, 6,448,659 and 6,969,533 and U.S. application Ser. No. 11/393,218. Preferably, the feed yarns have a denier of from 100 to 20,000 and are comprised of filaments of from 0.5 to 100 denier/filament. More preferably, the feed yarns have a denier of from 100 to 5,000 and are comprised of filaments of from 2 to 25 denier/filament.

Preferably, the plurality of feed yarns is wound up as a plurality of individual yarn packages or on one or more beams. Preferably, feed yarn packages are tube packages. Preferably, the plurality of feed packages or beams have uniform lengths of yarn and uniform dimensions. Preferably, the feed yarns are wound with the first several meters or so of yarn outside of the area where the remaining yarn is wound so as to create a "tail" that permits tying several yarn packages in series and unwinding continuously without need to stop a drawing operation to tie in yarns.

Preferably, from 2 to 1000 feed yarns are drawn simultaneously. More preferably, from 20 to 500 feed yarns are drawn simultaneously. Preferably, each beam has from 10 to 1000 yarns. Preferably, each unrolling creel has from 10 to 1000 package positions.

The unrolling torque for yarns on a beam is the same for all yarns. The unrolling torque for yarns on a creel can be set the same for each yarn by individual adjustment of slip clutches on each position of the creel. Preferably, the creel has a mechanism by which the same unrolling torque can be set simultaneously for all yarn packages and the torque is constant throughout the unwinding. A simple example of such a mechanism consists of leather straps attached to the creel structure at one end and wrapped around pulleys that are part of each package holder. The other ends of the leather straps are each attached by springs to the same moveable frame. The frame is free to slide within the creel structure. The frame position within the creel structure is set so as to stretch the springs. The springs tighten the straps causing friction of the straps on the pulleys, and simultaneously setting the unwind torque of each package holder. The mechanism is initially calibrated so the unrolling torque is substantially the same for each package. Preferably, the unrolling torque is from about 0.6 lb-in (0.07 N-m) to about 1.2 lb-in (0.14 N-m). Other mechanisms that can provide the same unwinding torque for each yarn package are also suitable, such as a magnetic slip clutch at each creel position such as described in U.S. Pat. No. 6,129,193 hereby incorporated by reference to the extent not incompatible herewith.

Preferably, the plurality of feed yarns is passed into the oven under substantially uniform and substantially constant tension. Substantially uniform tension means the standard deviation of yarn tension, yarn-to-yarn, is preferably less than 25% and more preferably, less than 10% of the mean tension. Substantially constant tension means that the standard deviation of the time variation of tension over 10 revolutions of a feed roll is preferably less than 25% and more preferably less than 10% of the mean tension.

The unrolling tension in yarns leaving a creel may be regulated by adjusting the electric power to magnetic slip clutches such as described in U.S. Pat. No. 6,129,193 in proportion to the outside diameter of the yarn packages as they unroll. Alternatively, the tension in the yarns as they pass from feed packages or beams may be regulated to be substantially uniform and substantially constant by having each yarn pass through a tension controller such as described in U.S. Pat. No. 6,457,666 B1 hereby incorporated by reference to the extent not incompatible herewith.

Preferably, the plurality of drawn yarns are wound up as yarn packages. Alternatively, the plurality of drawn yarns may be wound up on a beam.

Preferably, the plurality of drawn yarns is each passed out of the oven under substantially uniform tension. Preferably, the drawn packages are each wound at substantially uniform tension.

Preferably, the drawn packages or beams have uniform lengths of yarn and uniform dimensions. Preferably, the drawn yarns are wound with the first several meters or so of yarn outside of the area where the remaining yarn is wound so as to create a "tail".

Preferably, the drawn yarns are comprised of filaments having a denier/filament of from 0.1 to 20. More preferably, the drawn yarns are comprised of filaments having a denier/filament of from 0.1 to 10. Yet more preferably, the drawn yarns are comprised of filaments having a denier/filament of from 0.1 to 5. Still more preferably, the drawn yarns are comprised of filaments having a denier/filament of from 0.1 to 2. Most preferably, the drawn yarns are comprised of filaments having a denier/filament of from 0.1 to 1.

Figure 2:
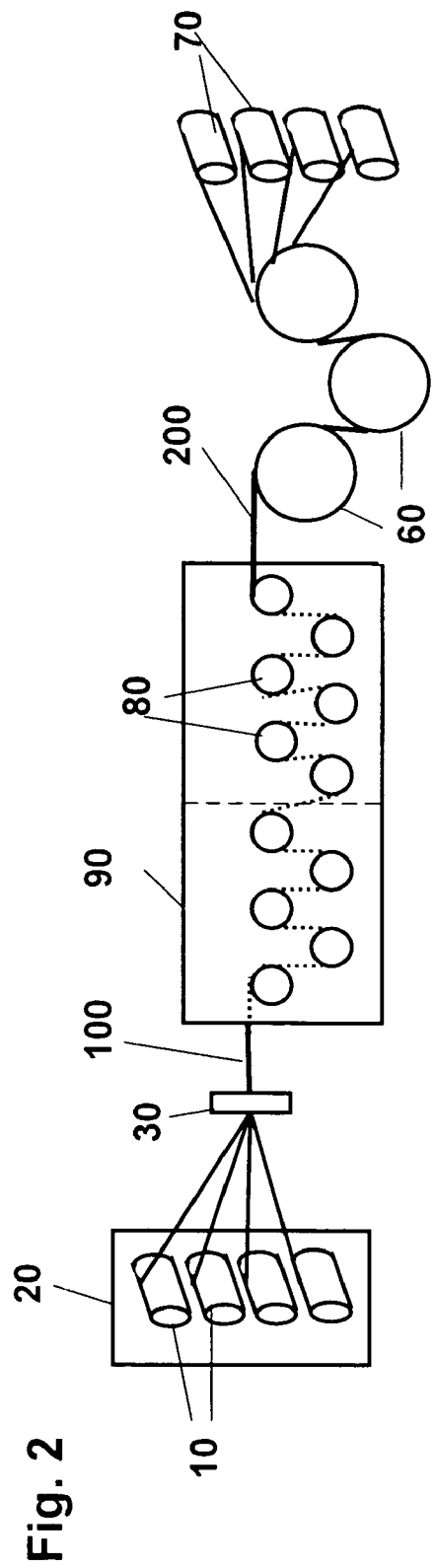

Two modes of carrying out this embodiment of the invention are illustrated schematically in FIGS. 1 and 2. FIG. 1 illustrates use of restraining rolls 40 and drawing rolls 60 external to a drawing oven 50. A plurality of UHMWPO feed yarns that had been wound on tube packages 10 without twist being imparted to the yarns are placed on one or more multiple position creels 20. The creel positions had been adjusted to provide the same unrolling torque to each package. One creel 20 and four yarn packages 10 are illustrated for simplicity but are not intended to be limiting. The plurality of feed yarns are unrolled from the packages at the same unwinding torque or at the same unwinding tension without imparting twist to the yarns and passed through a comb guide 30 that brings the feed yarns into side-by-side alignment. The side-by-side array of feed yarns 100 is passed over and under a set of large diameter (restraining) rolls 40 that set the speed and temperature with which the feed yarns are passed into an oven 50. The rolls 40 may possess an internal heat source and be temperature regulated. The number of rolls 40 necessary to restrain the yarn and regulate its speed into the oven will vary depending on the diameter, material, surface finish and operating temperature of the rolls and the strength, denier and frictional characteristics of the yarns. Three restraining rolls 40 are illustrated for convenience but the illustration is not intended to be limiting. The oven may have one or more temperature zones. Blowers and heaters (not illustrated) may provide hot gas circulation in the oven. The drawn yarns 200 are passed out of the oven 50 over and under a set of large diameter (drawing) rolls 60 that set the speed of the drawn yarns and the extent of draw in the oven 50. The illustration of three rolls is for convenience and is not intended to be limiting. The drawn yarns are wound up on tube packages 70 without imparting twist to the yarns.

FIG. 2 illustrates a second mode of carrying out this embodiment of the invention. As in the first mode, the packages of feed yarns 10 wound up without imparting twist thereto are placed on one or more creels 20 and unrolled at the same torque for each yarn. The yarns are passed through a comb guide 30 that brings the feed yarns into side-by-side parallel alignment. The side-by-side array of feed yarns 100 is passed into an oven 90. The oven 90 may have one or more temperature zones. Blowers and heaters (not illustrated) may provide hot gas circulation in the oven 90. Within the oven, the yarns are passed over and under a series of driven rolls 80, each roll 80 operating (rotating) at a higher speed than the one before. Eleven internal driven rolls are illustrated for convenience but the illustration is not intended to be limiting. The yarns are thereby stretched as they pass successively over each driven roll 80. The drawn yarns 200 are passed out of the oven 90 over and under a set of large diameter rolls 60 that set the final speed of the drawn yarns and cool them under tension. The drawn yarns are wound up on tube packages 70 without imparting twist to the drawn yarns.

In other modes of carrying out this embodiment of the invention, the creel 20 and the tube packages 10 can be replaced by one or more beams on which the feed yarns have been wound without imparting twist thereto. Similarly, the drawn yarns 200 may be wound up on one or more beams instead of on tube packages 70. These modes of carrying out the invention are not illustrated but will be readily understood by one of ordinary skill in the art.

The simultaneously drawn yarns produced by this process of the invention are more uniform in denier, tenacity and tensile modulus than a similar number of drawn yarns produced using a prior art process.

In another embodiment, the invention is a process for forming a unidirectional fibrous sheet comprising the steps of:

a) selecting a plurality of wound-up multi-filament untwisted high strength yarns selected from the group selected from the group consisting of UHMPO drawn as described above, poly(p-phenylene tererephthalamide), poly(p-phenylene-2,6-benzobisoxazole), poly {2,6-diimidazo[4,5-b4'5'-e]pyridinylene-1,4(2,5-dihydroxy) phenylene} and their blends and mixtures;

b) unrolling the plurality of high strength yarns without imparting twist to the yarns, wherein the unrolling torque is substantially the same for each yarn;

c) spreading the yarns side-by-side into their constituent filaments to form a unidirectional sheet-like array of parallel filaments;

d) applying a bonding material to the filaments; and e) consolidating the array of filaments and bonding material into a unitary unidirectional fibrous sheet.

High strength yarns for the purposes of the invention are yarns having tensile strengths determined by ASTM D2256-02 at least 17 g/d. Examples of such yarns are aramids such as KEVLAR® brand, polybenzazoles (PBO) such as ZYLON® brand, poly {2,6-diimidazo[4,5-b4'5'-e]pyridinylene-1,4(2, 5-dihydroxy)phenylene} such as M5® brand, ultra-high molecular weight poly(alpha-olefins) (UHMWPO), and their blends and mixtures. Ultra-high molecular weight polyolefins include polyethylene, polypropylene, poly(butene-1), poly(4-methyl-pentene-1), their copolymers, adducts, blends and mixtures. The method of the invention is applicable to the foregoing examples of high strength yarns but is not restricted to this list.

Preferably, the high strength yarns are unrolled at substantially the same tension. Preferably, the yarns are spread and the unidirectional sheet is formed as described in U.S. Pat. No. 4,916,000 heretofore incorporated by reference to the extent not incompatible herewith. Preferably, the unidirectional fibrous sheet of this invention has a ratio of sheet thickness to equivalent filament diameter of 12.8 or less.

Preferably, the drawn yarns are unrolled from one or more unrolling creels. Preferably, each unrolling creel has from 10 to 1000 package positions and the unidirectional fibrous sheet is formed from 10 to 2000 yarns. Alternatively, the drawn yarns may be unrolled from one or more beams, each beam holding 50 to 1000 yarns.

The invention includes a unidirectional fibrous sheet article prepared by the method of the invention. The fibrous sheet may be comprised of more than one high strength yarn having a random or patterned arrangement. In a further embodiment, the invention is an article comprising at least two unidirectional fibrous sheets prepared by the method of the invention bonded together surface-to-surface, wherein the direction of the filaments in a sheet are at angle to the direction of filaments in adjacent sheets.

Assemblies prepared from the unidirectional fibrous sheets of this invention have improved uniformity of ballistic resistance because of the greater physical property uniformity of the yarns of which they are constructed and the greater uniformity of the tension in the yarns as the unidirectional sheets are formed.

EXAMPLES

Comparative Example 1

A plurality of essentially identical UHMWPO feed yarns were prepared by the process described in U.S. Pat. No. 4,551,296. The yarns were comprised of a linear polyethylene having an intrinsic viscosity measured in decalin at 135° C. of about 12 dl/g. The 240 filament yarns were wound up as packages on cylindrical tubes of 3.988 inch (10.13 cm) outside diameter without twist being imparted to the yarns. The average denier, tenacity and initial tensile modulus (modulus of elasticity) of these feed yarn packages are shown in Table I below together with the standard deviations, and coefficients of variations of those characteristics. Tensile properties of the yarn's were measured by ASTM D-2256-02

Feed yarn packages were placed on two 48-position creels and 96 yarns were simultaneously unrolled without imparting twist to the yarns. No measures were taken to insure that the unrolling torque was the same for each yarn. Unrolling torque varied from about 0.6 lb-in (0.07 N-m) to about 1.8 lb-in (0.2 N-m) package-to-package. Moment-to-moment yarn tension was measured and recorded for a single feed roll by means of a load cell and a chart recorder. Instantaneous yarn tension averaged about 150 g±67% over a period of 12 revolutions of the feed roll.

The 96 yarns were aligned side-by-side, passed over and under a set of driven rolls and passed into, through and out of a forced convection oven maintained at a temperature of 150° C. to a second set of driven rolls as illustrated schematically in FIG. 1. The second set of driven rolls operated at a speed greater than the first set of rolls and served to draw the yarns in the oven. The drawn yarns were cooled under tension and wound up as individual tube packages without twist being imparted to the yarns. This process was repeated with new sets of 96 yarns until the entire group of feed yarns was drawn. The average denier, tenacity and initial tensile modulus of these drawn yarn packages are shown in Table I below together with the standard deviations, and coefficients of variation (C.O.V.) of those characteristics.

Example 1

A plurality of essentially identical UHMWPO feed yarn packages was prepared by the process described in U.S. Pat. No. 4,551,296. The yarns were comprised of a polyethylene having an intrinsic viscosity measured in decalin at 135° C. of 12 to 14 dl/g. The 240 filament yarns were wound up as packages on cylindrical tubes of 3.988 inch (10.13 cm) outside diameter without twist being imparted to the yarns. The average denier, tenacity and initial tensile modulus (modulus of elasticity) of these feed yarn packages as measured by ASTM D2256-02 are shown in Table I below together with the standard deviations, and coefficients of variations of those characteristics.

Feed yarn packages were placed on two 50-position creel's and 100 yarns were simultaneously unrolled without imparting twist to the yarns. The substantially uniform and substantially constant unrolling torque for each yarn was set at about 0.88 lb-in (0.098 N-m). Yarn tension averaged about 100 g±25% over 12 revolutions of a feed roll. The 100 feed yarns were aligned side-by-side in parallel, passed over and under a set of driven rolls and passed into, through and out of a forced convection air oven maintained at a temperature of 150° C. to a second set of driven rolls as illustrated schematically in FIG. 1. The second set of driven rolls operated at a speed greater than the first set of rolls and served to draw the yarns in the oven. The drawn yarns were cooled under tension and wound up as individual tube packages without twist being imparted to the yarns. This process was repeated with new sets of 100 yarns until the entire group of feed yarns was drawn. The average denier, tenacity and initial tensile modulus of these drawn yarn packages are shown in Table I below together with the standard deviations, and coefficients of variation of these characteristics.

TABLE I

| | EXAMPLE | | | |
| --- | --- | --- | --- | --- |
| | Comparative 1 | | Example 1 | |
| | Feed Yarn | Drawn Yarn | Feed Yarn | Drawn Yarn |
| Denier (Tex) | 2415 (268) | 1300 (144) | 2402 (267) | 1325 (147) |
| Std. Dev. (Tex) | 21.8 (2.42) | 28.8 (3.2) | 58.6 (6.5) | 20.4 (2.27) |
| C.O.V., % | 0.90 | 2.21 | 2.44 | 1.54 |

TABLE I-continued

| | EXAMPLE | | | |
|---|---|---|---|---|
| | Comparative 1 | | Example 1 | |
| | Feed Yarn | Drawn Yarn | Feed Yarn | Drawn Yarn |
| Tenacity, g/d (GPa) | 30.9 (2.64) | 34.7 (2.97) | 31.4 (2.69) | 37.5 (3.21) |
| Std. Dev., g/d (GPa) | 1.3 (0.11) | 1.25 (0.11) | 1.1 (0.094) | 0.86 (0.074) |
| C.O.V., % | 4.2 | 3.6 | 3.5 | 2.3 |
| Modulus, g/d (GPa) | 915 (78.3) | 1147 (98.1) | 888 (76.0) | 1245 (106) |
| Std. Dev., g/d (GPa) | 36.4 (3.11) | 47.2 (4.03) | 18.5 (1.58) | 21.7 (1.86) |
| C.O.V., % | 4.0 | 4.1 | 2.1 | 1.7 |

It will be seen that when yarn unrolling torque was not the same for each feed yarn, as in Comparative Example 1, the denier variation was greater in the drawn yarns than in the feed yarns. In contrast, when the unrolling torque was set to be substantially identical for each feed yarn, the denier was more uniform in the drawn yarns than in the feed yarns, and more uniform in the yarns drawn by the method of the invention than in the yarns drawn by the method of the Comparative Example. Similarly, the tensile properties of the yarns drawn by the method of the invention were more uniform compared to the feed yarns and more uniform than yarns drawn by the method of the Comparative Example.

Example 2

A plurality of feed yarns are prepared under the same conditions as described in Example 1 and having essentially the same properties as described in Example 1. The feed yarns are wound up without twist as tube packages of uniform length. Feed yarn packages are placed on two multiple position creels and a plurality of yarns are simultaneously unrolled without imparting twist to the yarns. Each yarn is passed through a tension controller as described in U.S. Pat. No. 6,457,666 such that the yarns leaving the tension controllers are under substantially uniform and substantially constant tension. The plurality of feed yarns are aligned side-by-side, passed over and under a set of driven rolls and passed into, through and out of a forced convection air oven under essentially uniform tension and drawn as described in Example 1. The drawn yarns are cooled under substantially uniform tension and are rewound without twist.

It is expected that the drawn yarns will be improved in uniformity of denier and tensile properties as compared to their feed yarns and as compared to the drawn yarns of Comparative Example 1.

Comparative Example 2

A plurality of tube packages of 240 filament polyethylene drawn yarns were prepared and wound up by the method of Comparative Example 1. The denier, tensile properties and uniformity of the drawn yarns were essentially identical to those shown in the second column of Table 1. The drawn yarn packages were placed on multiple position creels, unrolled and aligned side-by-side. No measures were taken to insure that the unrolling torque was the same for each yarn. Unrolling torque varied from about 0.6 lb-in (0.07 N-m) to about 1.8 lb-in (0.2 N-m) package-to-package. Yarn tension averaged about 150 g±67% over a period of 12 revolutions of a feed roll. The yarns were spread into their constituent filaments to form a unidirectional sheet-like array as described in U.S. Pat. No. 4,916,000. A bonding material was applied to the filaments and the array of filaments and bonding material was consolidated and rolled up as a unidirectional fibrous sheet of indefinite length. Two such rolls of unidirectional fibrous sheets were cross-plied and consolidated under heat and pressure as described in U.S. Pat. No. 5,173,138 hereby incorporated by reference to the extent not incompatible herewith.

Ballistic targets were formed each consisting of 37 layers of the cross-plied material described above stacked together surface-to-surface to an average areal density of 1.0276 lbs/ft$^2$ (5.022 Kg/m$^2$). The targets were fired at using a 0.22 caliber (5.588 mm), 17 grain (1.102 g) fragment simulating projectile and the V50 velocities for these targets measured by MIL-STD 662F. The Specific Energy Absorption (SEA) of the targets were calculated at the V50 velocities from the following relationship:

SEA, J-m$^2$/Kg=½ m (V50)$^2$/A.D.

Where:
m is the mass of the projectile in Kg
V50 is the V50 velocity in m/sec
A.D. is the target area density in Kg/m$^2$
The average results for 45 such targets are shown in Table II below.

Comparative Example 3

A plurality of tube packages of 240 filament polyethylene drawn yarns were prepared and wound up by the method of Comparative Example 1. The denier, tensile properties and uniformity of the drawn yarns were essentially identical to those shown in the second column of Table 1. The drawn yarn packages were placed on multiple position creels, unrolled at substantially uniform torque and aligned side-by-side. The substantially uniform and substantially constant unrolling torque for each yarn was set at about 0.88 lb-in (0.098 N-m). Yarn tension averaged about 100 g±25% over 12 revolutions of a feed roll. The yarns were spread into their constituent filaments to form a unidirectional sheet-like array as described in U.S. Pat. No. 4,916,000. A bonding material was applied to the filaments and the array of filaments and bonding material was consolidated and rolled up as a unidirectional fibrous sheet of indefinite length. Two such rolls of unidirectional fibrous sheets were cross-plied and consolidated under heat and pressure as described in U.S. Pat. No. 5,173,138.

Ballistic targets were formed each consisting of 37 layers of the cross-plied material described above stacked together surface-to-surface to an average areal density of 1.0245 lbs/ft$^2$ (5.007 Kg/m$^2$). The targets were fired at using a 0.22 caliber (5.588 mm), 17 grain (1.102 g) fragment simulating projectile and the V50 velocities for these targets measured by MIL-STD 662F. The Specific Energy Absorption for the targets was calculated at the V50 velocity by the same relationship as given above. The average results for 11 such targets are shown in Table II below.

TABLE II

|  | Comparative Example 2 | | Comparative Example 3 | |
| --- | --- | --- | --- | --- |
|  | ft/sec | m/sec | ft/sec | m/sec |
| V50 | 1682 | 512.7 | 1670 | 509.0 |
| Std. Dev. Of V50 | 34.6 | 10.5 | 22.1 | 6.7 |
|  | J-m$^2$/Kg | | J-m$^2$/Kg | |
| SEA | 28.8 | | 28.8 | |
| Std. Dev. Of SEA | 1.18 | | 0.82 | |

The targets made using the cross-plied unidirectional sheets made with yarns unrolled at constant torque (Comparative Example 3) had slightly lower average V50 than for the targets made in Comparative Example 2, but were also of slightly lower average areal density. The average Specific Energy Absorption of both sets of targets were identical. The principal difference was that the ballistic properties of the targets made with the cross-plied unidirectional sheets using yarns unrolled at constant torque were much more uniform than those of the comparative example in both the V50 velocity and the SEA as measured by the standard deviations of those properties.

Example 3

A plurality of tube packages of 240 filament polyethylene drawn yarns are prepared and wound up by the method of Example 1. The denier, tensile properties and uniformity of the drawn yarns are essentially identical to those shown in the fourth column of Table 1. The drawn yarn packages are placed on multiple position creels, unrolled at substantially uniform torque and aligned side-by-side. The substantially uniform and substantially constant unrolling torque for each yarn is set at about 1.0 lb-in (0.11 N-m). The yarns are spread into their constituent filaments to form a unidirectional sheet-like array as described in U.S. Pat. No. 4,916,000. A bonding material is applied to the filaments and the array of filaments and bonding material is consolidated and rolled up as a unidirectional fibrous sheet of indefinite length. Two such rolls of unidirectional fibrous sheets are cross-plied and consolidated under heat and pressure as described in U.S. Pat. No. 5,173,138.

Ballistic targets are formed each consisting of 37 layers of the cross-plied material described above stacked together surface-to-surface to an average areal density of about 1.0 lbs/ft$^2$ (4.887 Kg/m$^2$). The targets are fired at using a 0.22 caliber (5.588 mm), 17 grain (1.102 g) fragment simulating projectile and the V50 velocities for these targets measured by MIL-STD 662F. It is believed that the V50 velocity, the SEA and the uniformity of those properties will be superior to those measured in Comparative Examples 2 or 3.

Example 4

A plurality of tube packages of 1140 denier (1270 decitex), 768 filament KEVLAR® 49 brand high strength poly(p-phenylene tererephthalamide) aramid yarns are selected. The yarns have a tenacity of 23.6 g/d (20.8 cN/dtex) as measured by ASTM D2256=02. The yarn packages are placed on multiple position creels, unrolled at substantially uniform torque and aligned side-by-side. The substantially uniform and substantially constant unrolling torque for each yarn is set at about 1.0 lb-in (0.11 N-m). The yarns are spread into their constituent filaments to form a unidirectional sheet-like array as described in U.S. Pat. No. 4,916,000. A bonding material is applied to the filaments and the array of filaments and bonding material is consolidated and rolled up as a unidirectional fibrous sheet of indefinite length. Two such rolls of unidirectional fibrous sheets are cross-plied and consolidated under heat and pressure as described in U.S. Pat. No. 5,173,138.

Ballistic targets are formed of the cross-plied material described above stacked together surface-to-surface to an average areal density of about 1.0 lbs/ft$^2$ (4.887 Kg/m$^2$). The targets are fired at using a 0.22 caliber (5.588 mm), 17 grain (1.102 g) fragment simulating projectile and the V50 velocities for these targets measured by MIL-STD 662F. It is believed that the V50 velocity, the SEA and the uniformity of those properties will be superior in comparison to targets where the fibrous sheets are not formed from yarns unrolled at substantially constant and substantially uniform torque.

Example 5

A plurality of tube packages of 1300 denier (1170 decitex). 688 filament ZYLON® brand AS high strength poly(p-phenylene-2,6-benzobisoxazole) (PBO) yarns are selected. The yarns have a tenacity of 42 g/d (37 cN/dtex). The yarn packages are placed on multiple position creels, unrolled at substantially uniform torque and aligned side-by-side. The substantially uniform and substantially constant unrolling torque for each yarn is set at about 1.0 lb-in (0.11 N-m) measured at the outside diameter of the package cores. The yarns are spread into their constituent filaments to form a unidirectional sheet-like array as described in U.S. Pat. No. 4,916,000. A bonding material is applied to the filaments and the array of filaments and bonding material is consolidated and rolled up as a unidirectional fibrous sheet of indefinite length. Two such rolls of unidirectional fibrous sheets are cross-plied and consolidated under heat and pressure as described in U.S. Pat. No. 5,173,138.

Ballistic targets are formed of the cross-plied material described above stacked together surface-to-surface to an average areal density of about 1.0 lbs/ft$^2$ (4.887 Kg/m$^2$). The targets are fired at using a 0.22 caliber (5.588 mm), 17 grain (1.102 g) fragment simulating projectile and the V50 velocities for these targets measured by MIL-STD 662F. It is believed that the V50 velocity, the SEA and the uniformity of those properties will be superior in comparison to targets where the fibrous sheets are not formed from yarns unrolled at substantially constant and substantially uniform torque.

Example 6

A plurality of tube packages of high strength poly {2,6-diimidazo[4,5-b4'5'-e]pyridinylene-1,4(2,5-dihydroxy)phenylene} (M5® brand) yarns are selected. The yarns have a tenacity of 42 g/d (37 cN/dtex). The yarn packages are placed on multiple position creels, unrolled at substantially uniform torque and aligned side-by-side. The substantially uniform and substantially constant unrolling torque for each yarn is set at about 1.0 lb-in (0.11 N-m) measured at the outside diameter of the package cores. The yarns are spread into their constituent filaments to form a unidirectional sheet-like array as described in U.S. Pat. No. 4,916,000. A bonding material is applied to the filaments and the array of filaments and bonding material is consolidated and rolled up as a unidirectional fibrous sheet of indefinite length. Two such rolls of unidirectional fibrous sheets are cross-plied and consolidated under heat and pressure as described in U.S. Pat. No. 5,173,138.

Ballistic targets are formed of the cross-plied material described above stacked together surface-to-surface to an average areal density of about 1.0 lbs/ft$^2$ (4.887 Kg/m$^2$) The targets are fired at using a 0.22 caliber (5.588 mm), 17 grain (1.102 g) fragment simulating projectile and the V50 H) velocities for these targets measured by MIL-STD 662F. It is believed that the V50 velocity, the SEA and the uniformity of those properties will be superior in comparison to targets where the fibrous sheets are not formed from yarns unrolled at substantially constant and substantially uniform torque.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A process for simultaneously drawing multiple ultra-high molecular weight poly(alpha-olefin) (UHMWPO) yarns comprising the steps of:
   a) forming a plurality of substantially identical gel-spun multi-filament feed yarns comprising an UHMWPO having an intrinsic viscosity measured in decalin at 135° C. from 5 dl/g to 45 dl/g, said feed yarns having a tenacity of from 5 g/d to 65 g/d (0.43 GPa to 5.56 GPa) as measured by ASTM D2256-02, a denier of from 100 to 20,000, and the filaments of said yarns being of from 0.5 to 100 denier/filament (0.055 to 11.1 text/filament);
   b) winding up said plurality of feed yarns without imparting twist to the yarns;
   c) unrolling the plurality of feed yarns without imparting twist to the yarns, wherein the unrolling torque is from about 0.6 lb-in (0.07 N-m) to about 1.2 lb-in (0.14 N-m) and the unrolling torque is substantially the same for each yarn;
   d) passing the plurality of feed yarns simultaneously and continuously into, through, and out of an oven, wherein one or more zones are present along the yarn path, said zones having zone temperatures in the range of about 100° C. to about 165° C., and wherein the exiting speed of the yarns from the oven is greater than the entrance speed of the yarns into the oven, said yarns being drawn in the oven;
   e) cooling the drawn yarns under tension; and
   f) winding up a plurality of the drawn yarns without imparting twist thereto.

2. The process of claim 1, wherein said UHMWPO is polyethylene.

3. The process of claim 1, wherein said feed yarns are wound up in a form selected from the group consisting of tube packages and a beam.

4. The process of claim 3, wherein said feed yarns are wound up with tails.

5. The process of claim 3, wherein said feed yarns are wound up with uniform yarn length.

6. The process of claim 1 wherein the plurality of feed yarns is passed into said oven under substantially uniform and constant tension.

7. The process of claim 1, wherein the plurality of drawn yarns are passed out of said oven under substantially uniform tension.

8. The process of claim 1, wherein the drawn yarns are wound up in a form selected from the group consisting of tube packages and beams.

9. The process of claim 1, wherein the drawn yarns are wound up with uniform yarn length.

10. The process of claim 1, wherein the drawn packages are wound at substantially the same tension.

11. The process of claim 1, wherein the drawn yarns are comprised of filaments having a denier/filament of from 0.1 to 20.

12. The process of claim 1, wherein the drawn yarns are comprised of filaments having a denier/filament of from 0.1 to 2.

13. The process of claim 1, wherein from 2 to 1000 feed yarns are drawn simultaneously.

14. The process of claim 1, wherein from 20 to 500 feed yarns are drawn simultaneously.

* * * * *